L. H. ARZT.
WINDOW CLEANER.
APPLICATION FILED NOV. 17, 1909.

954,158.

Patented Apr. 5, 1910.

2 SHEETS—SHEET 1.

Witnesses

Inventor
Louis H. Arzt,
By Joshua R. H. Potts,
Attorney

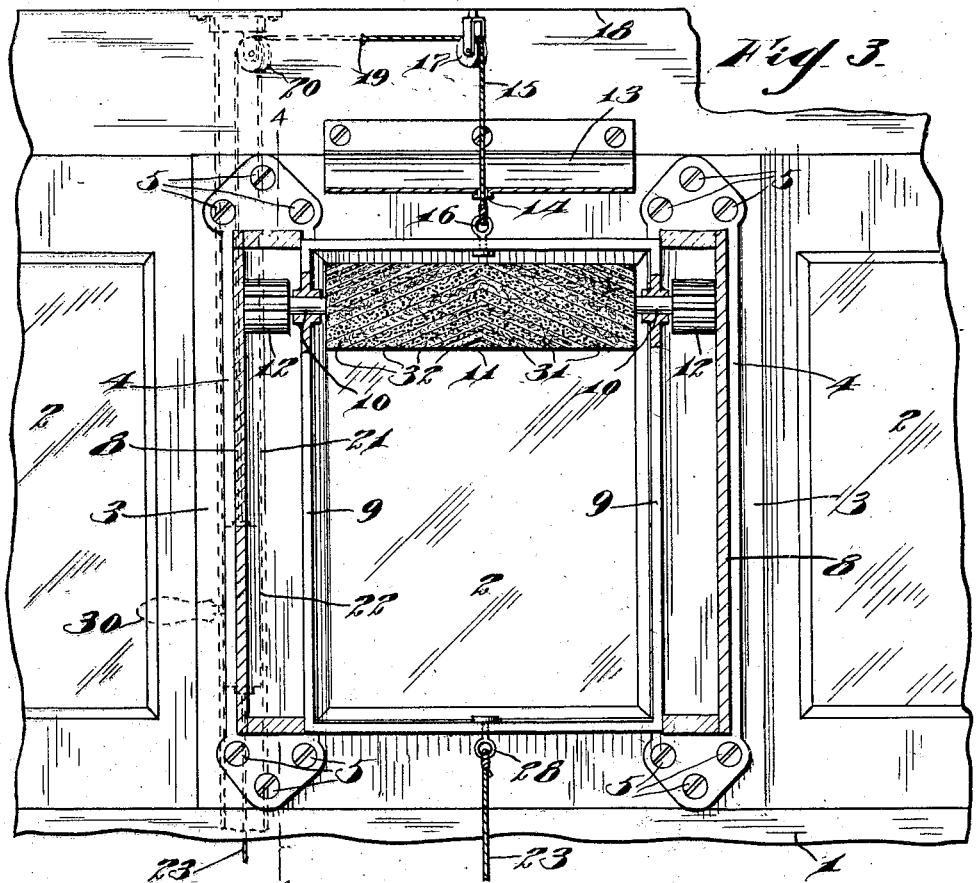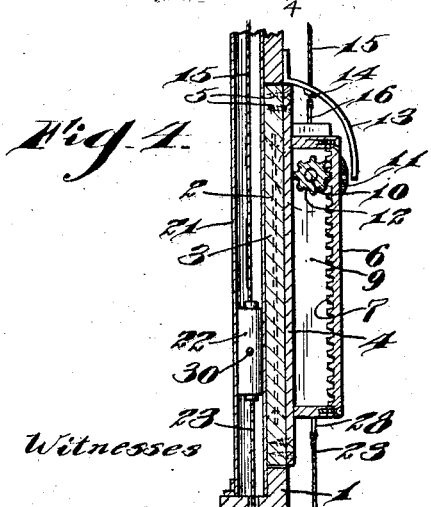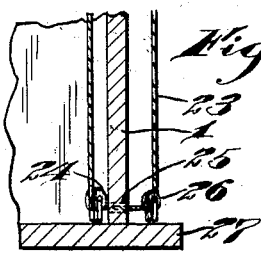

UNITED STATES PATENT OFFICE.

LOUIS H. ARZT, OF PHILADELPHIA, PENNSYLVANIA.

WINDOW-CLEANER.

954,158.    Specification of Letters Patent.    Patented Apr. 5, 1910.

Application filed November 17, 1909. Serial No. 528,449.

*To all whom it may concern:*

Be it known that I, LOUIS H. ARZT, a citizen of the United States, residing at Philadelphia, in the county of Philadelphia and State of Pennsylvania, have invented certain new and useful Improvements in Window-Cleaners, of which the following is a specification.

My invention relates to improvements in window cleaners, and is designed particularly as an attachment for street cars, and located in a position to clean the outside of the front window of a car platform by manipulating a handle on the inside of the car platform so as to clean the window of snow, ice, and frost, permitting the motorman to keep the outside of the window clean, and hence maintaining a clear view of what is going on in front of the car.

A further object is to provide an improved device of this character, which can be readily secured in position on a car, which can be easily operated by the motorman, and which will most effectually rub and scrape the window so as not only to clean the snow and ice from the glass, but dry the same after cleaning.

With these and other objects in view, the invention consists in certain novel features of construction and combinations and arrangements of parts, as will be more fully hereinafter described and pointed out in the claims.

Figure 1:
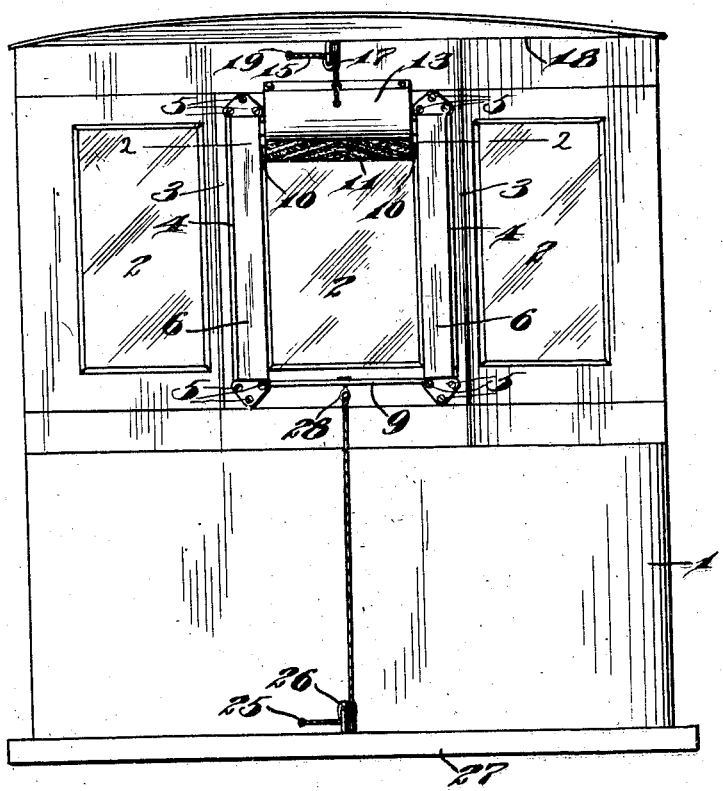
Figure 2:
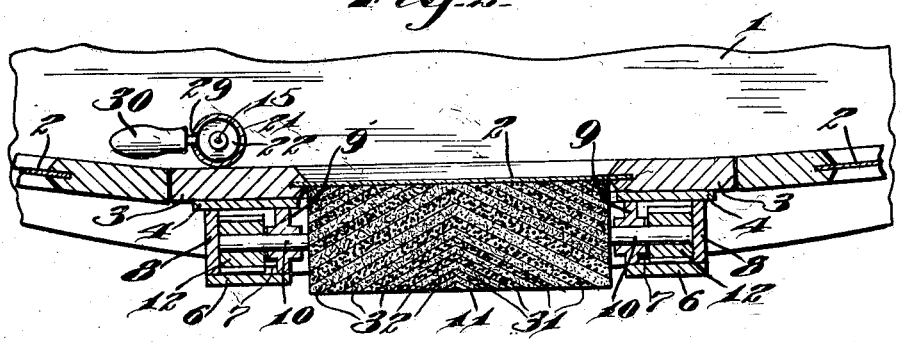

In the accompanying drawings: Figure 1 is a view in elevation of a car illustrating the application of my improvements. Fig. 2 is an enlarged view in cross section on the line 2—2 of Fig. 1. Fig. 3 is an enlarged fragmentary view, partly in elevation and partly vertical section. Fig. 4 is a fragmentary view in vertical section on the line 4—4 of Fig. 3, and Fig. 5 is a fragmentary view in vertical section through the lower portion of the car front.

1 represents the ordinary dash board of a car and 2 are the windows in the car end, and my improvements are shown as applied to the center window 2.

To the upright bars 3, between the windows, plates 4, 4 are secured by means of screws 5, and these plates 4, 4, have outwardly projecting lugs 5, to which bars 6 are secured, said bars having gear teeth on their inner faces constituting racks 7, and bars or plates 8 are secured between the bars 6 and plates 4 at one edge, to exclude the weather from between the bar 6 and plate 4 at the outer edges thereof.

9 represents my improved rectangular frame, the side members of which are adapted to move between and snugly fit between the bars 6 and plates 4, and exclude the weather from the compartments thus formed, and prevent the racks from becoming clogged. In the frame 9, a shaft 10 is mounted, and is provided between the members of the frame with my improved roller 11. Pinions 12 are secured on shaft 10 and are in mesh with the racks 7, so that when the frame 9 is moved up and down, the racks 7 will compel the pinions 12, shaft 10 and roller 11 to revolve and exert a rubbing action of the roller 11 against glass 2. To the upper portion of the car front, a shield 13 is secured and extends out far enough to protect the roller 11 from the weather. This shield 13 is made with an opening 14 through which a rope or cable 15 is passed, and is secured at one end to an eye 16, fastened to the upper end of frame 9. This rope 15 passes over pulley 17 secured to the overhanging front portion 18 of the car roof, and is then passed diagonally through an opening 19 in the car front, thence over a pulley 20 secured inside the car, thence down through a tube 21, where it is secured to a counterweight 22, located within and movable within the tube 21. A second rope or cable 23 is secured to the lower end of weight 22, and passes down and around a pulley 24 at the lower portion of the car platform, thence through a diagonal opening 25 in the car front, thence under a pulley 26 on the buffer bar 27 of the car and thence up to and secured to an eye 28 on the bottom of frame 9.

The tube 21, which is located between the windows 2, is provided with a longitudinal slot 29, and a handle 30 projects through this slot and is secured to the weight 22 so that by moving the handle up and down, the weight will be moved up and down and frame 9 will be caused to reciprocate up and down in front of the center glass 2. When this reciprocation of frame 9 takes place, the engagement of pinions 12, with racks 7, will cause the roller 11 to revolve in a direction to exert a rubbing action against the glass 2, to thoroughly cleanse the same. This roller 11 preferably comprises alternate lines of wire bristles 31 and felt 32. These lines are preferably at an angle tapering toward the center of the roller so as to compel the wires to exert a cam or scraping action against the window to thoroughly clean the snow and ice, and then the felt lines will wipe dry any moisture on the glass. By this means the motorman may at any time reciprocate handle 30 to thoroughly cleanse the outside of the window, and thus maintain the window clean and insure a perfect view at all times.

Various slight changes might be made in the general form and arrangement of parts described without departing from my invention and hence I do not restrict myself to the precise details set forth, but consider myself at liberty to make such changes and alterations as fairly fall within the spirit and scope of the appended claims.

Having thus described my invention what I claim as new and desire to secure by Letters Patent is:

1. The combination of longitudinal bars adapted to be secured to and spaced from the end of a car, teeth on the inner faces of said bars forming racks, a frame mounted between said bars, a shaft supported in said frame, pinions on said shaft meshing with said rack bars, a roller on said shaft adapted to engage the window, and ropes connected to the ends of said frame and projecting through and into the inside of the car platform, a weight secured to said ropes, a tube in which said weight is mounted to reciprocate, said tube having a longitudinal slot therein, and a handle secured to said weight and projecting through said slot.

2. The combination of longitudinal plates adapted to be secured to a car end beside the car window, bars secured to said plates and disposed edgewise and located near the outer edges of said plates, outwardly projecting lugs secured to said plates at the ends of said bar, bars secured to said lugs and disposed parallel with the plates, and having teeth on their inner faces, a rectangular frame having its side bars fitting between said plates and said rack bars, forming inclosed spaces, a shaft mounted in said frame and projecting at its ends into said inclosed spaces, pinions on the ends of said shaft meshing with the teeth on said bars, a roller secured on said shaft inside the frame and adapted to rub against the window, and means for moving said frame vertically.

3. The combination of longitudinal plates adapted to be secured to a car end beside the car window, bars secured to said plates and disposed edgewise and located near the outer edges of said plates, outwardly projecting lugs secured to said plates at the ends of said bars, bars secured to said lugs and disposed parallel with the plates and having teeth on their inner faces, a rectangular frame having its side bars fitting between said plates and said rack bars, forming inclosed spaces, a shaft mounted in said frame and projecting at its ends into said inclosed spaces, pinions on the ends of said shaft meshing with the teeth on said bars, a roller secured on said shaft inside the frame and adapted to rub against the window, a vertical tube secured inside the car end, a weight mounted in said tube and having a handle thereon projecting through a slot in said tube, pulleys at the upper and lower ends of the car end, and ropes secured to the upper and lower ends of said frame, passed over said pulleys and secured to the upper and lower ends of said weight.

In testimony whereof I have signed my name to this specification in the presence of two subscribing witnesses.

LOUIS H. ARZT.

Witnesses:
JOSHUA R. H. POTTS,
CHAS. E. POTTS.